United States Patent
Liu et al.

(10) Patent No.: US 7,126,790 B1
(45) Date of Patent: Oct. 24, 2006

(54) MAGNETIC HEAD FOR PERPENDICULAR RECORDING WITH MAGNETIC LOOP PROVIDING NON-PERPENDICULAR WRITE FIELD

(75) Inventors: Francis H. Liu, Fremont, CA (US); Kroum S. Stoev, Fremont, CA (US); Yugang Wang, Milpitas, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 403 days.

(21) Appl. No.: 10/724,309

(22) Filed: Nov. 26, 2003

(51) Int. Cl.
*G11B 5/147* (2006.01)
(52) U.S. Cl. ...................................... 360/126
(58) Field of Classification Search ............. None
See application file for complete search history.

(56) References Cited

U.S. PATENT DOCUMENTS

| | | | |
|---|---|---|---|
| 4,672,493 A | 6/1987 | Schewe | |
| RE33,949 E | 6/1992 | Mallary et al. | |
| 5,875,080 A | 2/1999 | Seagle | |
| 6,320,725 B1 | 11/2001 | Payne et al. | |
| 6,504,675 B1 | 1/2003 | Shukh et al. | |
| 6,710,972 B1 | 3/2004 | Mochizuki et al. | |
| 6,791,796 B1 * | 9/2004 | Shukh et al. | 360/126 |
| 6,954,340 B1 * | 10/2005 | Shukh et al. | 360/317 |
| 7,009,812 B1 | 3/2006 | Hsu et al. | |

OTHER PUBLICATIONS

U.S. Appl. No. 09/978,435, Seagle et al., Pending.
U.S. Appl. No. 09/933,508, Chen et al., Pending.

* cited by examiner

*Primary Examiner*—A. J. Heinz
(74) *Attorney, Agent, or Firm*—Jonathan E. Prejean, Esq.; Sawyer Law Group LLP

(57) ABSTRACT

A magnetic head for writing information on perpendicular media has a write pole tip and a return pole tip with a media-facing area at least two orders of magnitude greater than that of the write pole tip, the return pole tip is spaced from a trailing corner of the write pole tip by a submicron nonferromagnetic gap. Magnetic flux emanating from the write pole tip is strongest adjacent the trailing corner and directed at an angle that is not perpendicular to the write pole tip. The angled flux provides increased torque to rotate magnetic dipoles in the adjacent media layer that are oriented substantially perpendicular to the disk surface. The media may have a soft magnetic underlayer that is spaced from the write pole tip by a distance similar to the gap spacing.

37 Claims, 6 Drawing Sheets

MAGNETIC HEAD FOR PERPENDICULAR RECORDING WITH MAGNETIC LOOP PROVIDING NON-PERPENDICULAR WRITE FIELD

CROSS-REFERENCE TO RELATED APPLICATIONS

Related disclosure of an electromagnetic head for writing information on a relatively-moving medium can be found in the U.S. patent application Ser. No. 10/724,385, entitled Magnetic Head for Perpendicular Recording with Magnetic Structure Providing Non-Perpendicular Write Field, by the same inventors and filed on Nov. 26, 2003, and assigned to the assignee of the present application, which is incorporated by reference herein.

BACKGROUND

The present invention relates to electromagnetic transducers for information storage and retrieval systems, such as disk or tape drives.

Current commercially available disk drives employ magnetoresistive (MR) sensors for reading data, and store data in domains having magnetizations that are substantially parallel to concentric media tracks, the parallel magnetic storage sometimes called longitudinal recording. It has been predicted that such longitudinal magnetic storage will become unstable at normal operating conditions when the domains reach a minimal size, termed the superparamagnetic limit. In order to store the data at higher density, the drive system may instead be designed to store data in domains that are substantially perpendicular to the disk surface, which may be termed perpendicular recording.

FIG. 9 shows a prior art system for perpendicular recording, which includes an inductive transducer 20 positioned in close proximity to a surface 25 of a medium such as a disk 22. The inductive transducer 20 has a U-shaped core 30 formed of high-permeability, low-coercivity or "soft magnetic" material and the disk 22 has a soft magnetic underlayer 33, the core and underlayer forming a magnetic circuit indicated by flux lines 28 that traverse a higher coercivity media layer 32, for magnetizing the media layer or reading the magnetization of the media layer. The core has magnetic pole tips 36 and 38 that differ in media-facing area so that the magnetic signal is concentrated in the smaller pole tip for reading or writing data. The local portion of the disk may be traveling in the direction of arrow 40 or in a reverse direction, to write magnetic signals on a track. The pole tips are sufficiently separated to encourage magnetic flux to travel through the media, instead of across a submicron nonmagnetic gap that is typically employed for longitudinal recording. The prior art transducer of FIG. 9 is sometimes called a probe head.

U.S. Pat. No. 6,320,725 to Payne et al. discloses a transducer with a ring-shaped core terminating in a pair of pole tips that are separated by a nonmagnetic gap, with write fields emanating from corners of the pole tips closest to the gap, which may be termed a ring head. The ring head of Payne et al. has a head to medium spacing that is a fraction of the gap spacing, so that perpendicular rather than longitudinal write fields predominate in the media layer, with the leading corner of the trailing pole tip leaving the magnetic signal on the disk.

U.S. Pat. No. Re. 33,949 to Mallary et al. discloses a head for perpendicular recording with a write pole that is shielded with a downstream shield so that non-perpendicular fringe fields do not demagnetize the perpendicular signal written by the write pole. Mallary et al. note that reducing the spacing between the head and the medium allows the spacing between the write pole and the shield to be increased, because there is a greater incentive for flux to pass between the more closely spaced head and medium.

SUMMARY

In one embodiment, a magnetic head for writing information on a relatively-moving medium is disclosed, the head comprising a body having a leading end, a trailing end and a medium-facing surface, the body including an electrically conductive coil section at least partly encircled by a magnetic loop terminating in a write pole tip and a return pole tip that are disposed adjacent to the medium-facing surface and separated from each other by a nanoscale nonferromagnetic gap, wherein the return pole tip is disposed between the write pole tip and the trailing end and the return pole tip has a medium-facing area that is at least two orders of magnitude greater than that of the write pole tip.

The head is designed so that magnetic flux emanating from the write pole tip is strongest adjacent its trailing corner and directed at an angle that is not perpendicular to the write pole tip. The angled flux provides increased torque to rotate magnetic dipoles in the adjacent media layer that are oriented substantially perpendicular to the disk surface. To encourage this angled flux, the medium can have a soft magnetic underlayer that is spaced from the write pole tip by a similar distance as the gap spacing between the pole tips.

In one embodiment, the coil section is part of an electrically conductive coil that spirals around a first magnetic section that magnetically couples the write pole tip to the return pole tip, and a second electrically conductive coil or winding spirals exterior to the magnetic loop, such that a current spiraling in a first direction in the coil spirals in a substantially opposite direction in the winding.

In one embodiment, a magnetoresistive sensor can be disposed in the body between a pair of shields that are disposed adjacent to the magnetic loop. In another embodiment, the return pole tip can be the termination of a return pole layer that also serves as a shield for a magnetoresistive sensor.

DETAILED DESCRIPTION OF THE PREFERRED EMBODIMENT

Figure 1:
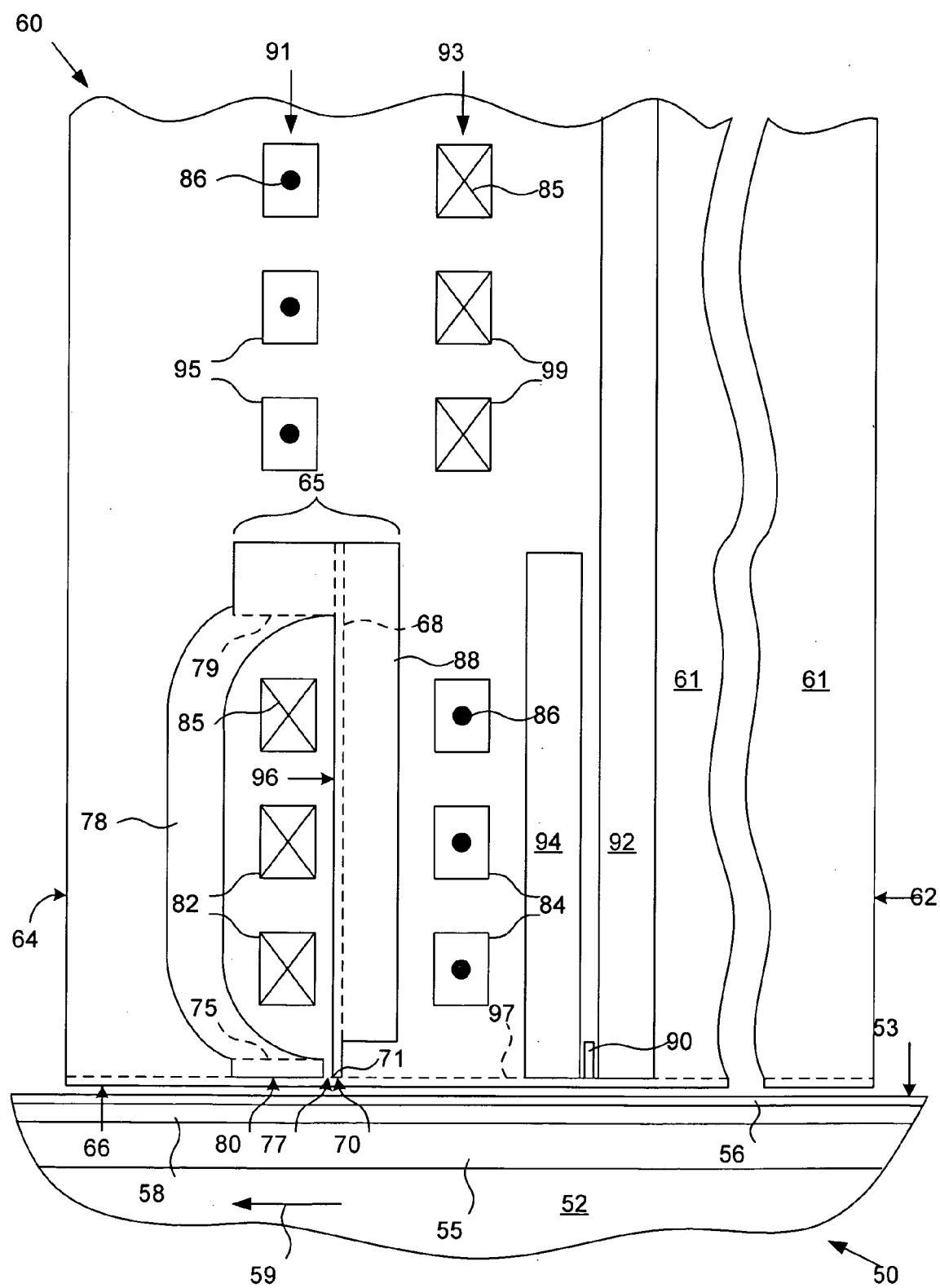
FIG. 1 is a cutaway cross-sectional view of an electromagnetic head in proximity to a relatively moving medium.

FIG. 1 is a cutaway cross-sectional view of a magnetic head 60 in proximity to a relatively moving medium 50. The medium 50 includes a substrate 52 over which a soft magnetic underlayer 55 has been formed. A media layer 58 is disposed over the underlayer 55, the media layer having an easy axis of magnetization that is substantially perpendicular to a major surface 53 of the medium. A thin, physically hard overcoat 56 separates the media layer 58 from the medium surface 53. The medium 50, which may for example be a rigid disk, is moving relative to the head in a direction shown by arrow 59. The head 60 may be spaced from the medium 50 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers.

The head 60 has a leading end 62, a trailing end 64 and a medium-facing surface 66. A first ferromagnetic layer 68 disposed in the head terminates adjacent to the medium-facing surface in a first pole tip 70. A second ferromagnetic layer 78 is magnetically coupled to the first ferromagnetic layer 68 in a region 65 that is removed from the medium-facing surface 66, the second ferromagnetic layer terminating adjacent to the medium-facing surface in a second pole tip 80. The second pole tip 80 is disposed between the first pole tip 70 and the trailing end 64, the second pole tip being separated from the first pole tip by a nanoscale nonferromagnetic gap 77.

A third ferromagnetic layer 88 adjoins the first ferromagnetic layer 68 but terminates further from the medium-facing surface 66 than the first pole tip 70, layers 68 and 88 combining to form a write pole layer. A ferromagnetic pedestal 75 and a ferromagnetic stud 79 can be considered to form part of the second ferromagnetic layer 78. The ferromagnetic layers 68, 78 and 88 of the head 60 may have a permeability of at least one thousand, while layer 68 may also be formed of a high magnetic moment material, e.g., having a magnetic saturation of at least twenty kiloGauss. First ferromagnetic layer 68 has a trailing edge 96 disposed adjacent to trailing end 64. A trailing corner 71 of first pole tip 70, disposed where first pole tip 70 meets trailing edge 96, is approximately equidistant from soft magnetic underlayer 55 and soft magnetic pole layer 78 in this example. The first pole tip 70, including the trailing corner 71, is in this embodiment made of higher magnetic saturation material than that of soft magnetic pole layer 78.

A plurality of electrically conductive coil sections 82 are disposed between the first ferromagnetic layer 68 and the second ferromagnetic layer 78 to induce magnetic flux in the first, second and third ferromagnetic layers 68, 78 and 88. Those ferromagnetic layers 68, 78 and 88 form a magnetic loop around coil sections 82, the loop interrupted by nanoscale nonferromagnetic gap 77. Another plurality of electrically conductive coil sections 86 may be similarly disposed between the first ferromagnetic layer 68 and the leading end 62. Crosses 85 in the coil sections 82 indicate electric current that is flowing away from the viewer and into the page, while dots 86 in the coil sections 84 indicate electric current that is flowing toward the viewer and out of the page. With electric current flowing in substantially opposite directions in sections 82 and 84 as shown, the magnetic field from the coil sections 82 and 84 adds together in the area between the sections 82 and 84 and is at least partly cancelled in areas outside the sections 82 and 84 that are closer to the leading or trailing end.

The coil sections 82 in this embodiment are part of a first coil layer 91 that spirals around stud 79 and coupling region 65 and includes electrically conductive coil sections 95. Coil sections 84 are part of a second coil layer 93 that spirals around an axis substantially aligned with that of the first coil layer, and includes electrically conductive coil sections 99. Another magnetic stud, not shown, may optionally be provided at the axis of coil layer 93 and coupled to ferromagnetic layer 88. Coil sections 95 have electric current that is flowing toward the viewer and out of the page, as indicated by dots 86, while coil sections 99 have electric current that is flowing away from the viewer and into of the page, as indicated by crosses 85. Advantages of a reversed double coil layer configuration such as this include a stronger applied field between the coil layers 91 and 93 and reduced or cancelled field leading and trailing the coil layers, as well as reduced coil inductance and reduced amplification of stray signals due to an antenna effect. The coil layers may spiral in identical directions, e.g., both spiraling inward in a counterclockwise direction when viewed from the trailing end, and be interconnected at the center sections or outermost sections. Alternatively, the coil layers may spiral in opposite directions and have the center section of one layer connected to the outermost section of the other layer. In one embodiment twelve or fewer coil sections are disposed between ferromagnetic layers 68 and 89.

Instead of the configuration shown in FIG. 1, coil sections 82 and 84 may spiral in a barber pole formation around ferromagnetic layers 68 and 88, without the need for coil sections 95 and 99. Alternatively, instead of plural coil sections 82, a single coil section or multiple coil sections may pass between layers 68 and 78. For the case in which coil section 82 is a single section formed as a layer, that layer may be connected to a similar layer disposed between layer 88 and the leading end 62. This formation may be termed a single turn coil.

The ferromagnetic layers 68 and 78 of the head 60 together with the soft magnetic underlayer 55 of the disk 50 form a magnetic circuit that traverses the media layer adjacent to the first pole tip 70 and the second pole tip 80. Although not clear in this cross-sectional view, the second pole tip 80 has a medium-facing area that is at least two orders of magnitude greater than that of the first pole tip 70, to avoid overwriting with the second pole tip signals that were imparted to the media layer by the first pole tip. Ferromagnetic layers 68 and 78 also form a magnetic circuit that is interrupted by the gap 77 so that fringe fields from that circuit traverse the media layer adjacent to the gap 77. These magnetic circuits add to create a maximum magnetic flux in the media-layer 58 at a location closest to the gap and at an angle from perpendicular to the medium surface 53.

The head 60 also includes a magnetoresistive (MR) sensor 90 sandwiched between first and second soft magnetic shield layers 92 and 94. The MR sensor 90 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. Other electromagnetic sensors, such as optical sensors, can alternatively be employed to sense magnetic fields from the medium. A thin hard coating 97 formed for example of diamond-like carbon (DLC), silicon carbide (SiC), tetrahedral amorphous carbon (ta-C) or the like protects the MR sensor 90 from corrosion or other damage, the coating forming at least part of the medium-facing surface 66. The MR sensor 90 is disposed adjacent to a substrate 61 on which the aforementioned thin film layers of the head 60 have been formed. The substrate 61 may extend much further between the first shield 92 and the leading end 62 than the distance between the first shield and the trailing end 64, and may be formed of any appropriate substrate material known in the art of magnetic heads, such as alumina, silicon, alumina-titanium-carbide, ferrite, etc.

Figure 2:
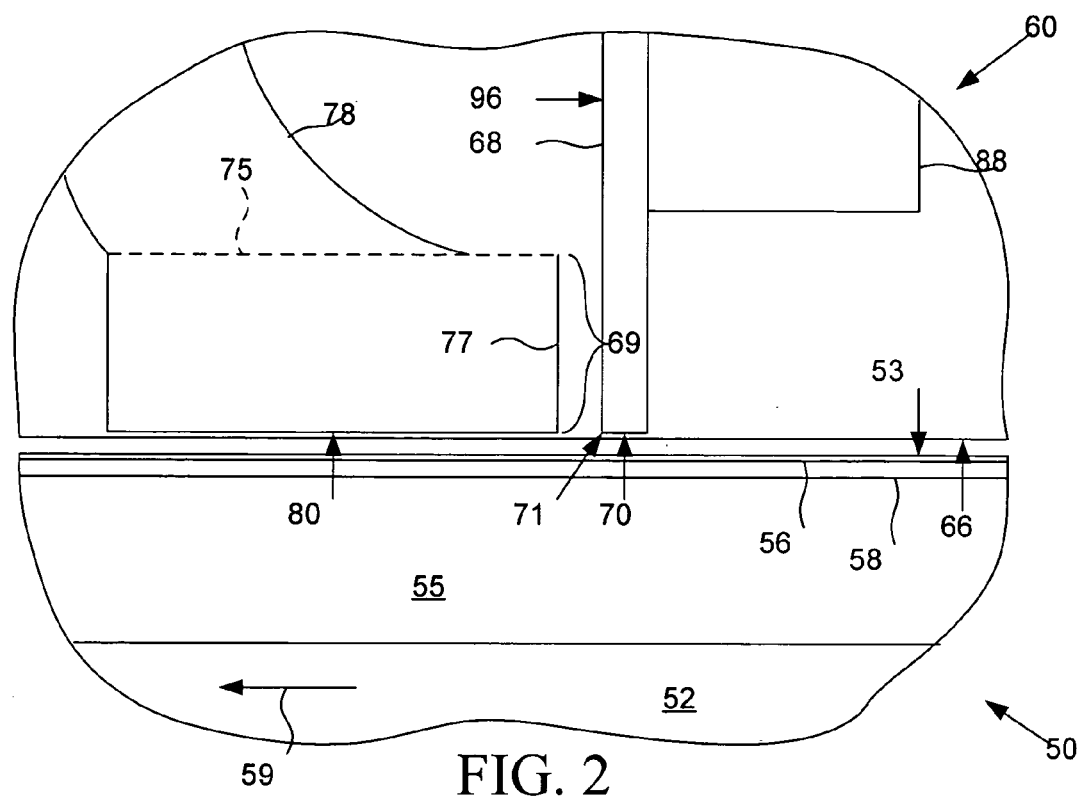
FIG. 2 is an expanded cross-sectional view of the head of FIG. 1 that focuses on a region around the pole tips of that head.
Figure 3:
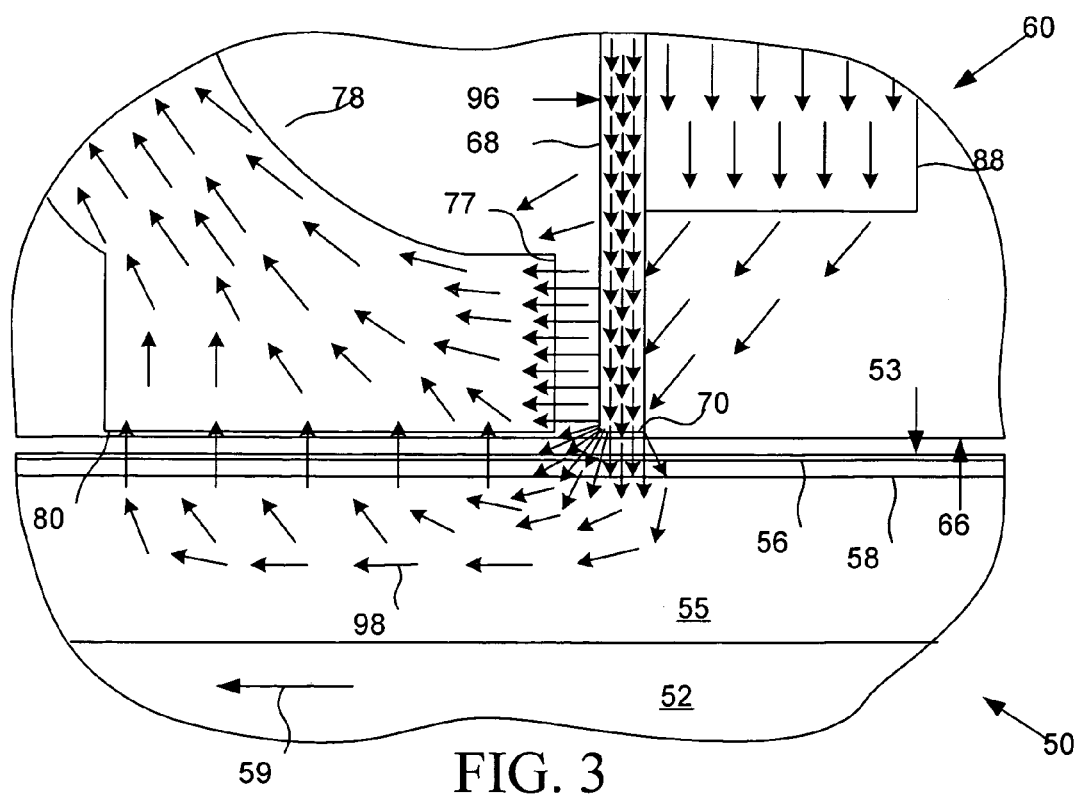
FIG. 3 is an expanded cross-sectional view of the head of FIG. 1 that focuses on a region around the pole tips of that head and includes a representation of magnetic flux that may be provided by the head during operation.

FIG. 2 is an expanded cross-sectional view that focuses on the region around pole tips 70 and 80, and FIG. 3 illustrates magnetic flux that may flow through those pole tips and into the medium 50 during operation. Magnetic flux, indicated by arrows 98, flows through soft magnetic pole layer 88 and is concentrated in high magnetic moment layer 68. From layer 68 the flux 98 emanates from write pole tip 70 and traverses media layer 58 to flow through the soft magnetic underlayer 55, thereafter crossing return pole tip 80 to flow through layer 78. Flux from layer 68 also emanates from a trailing edge 96 of that layer, traversing gap 77 to flow into the return pole layer 80.

As shown in FIG. 2, the nonmagnetic gap 77 expands at a throat height 69, which is measured from the medium-facing surface and in this embodiment is essentially equal to the extension of ferromagnetic pedestal 75 from the medium-facing surface 66. The throat height 69 is a parameter in controlling how much flux is diverted from layer 68 to layer 78, rather than traveling through the medium, and thus affects the efficiency of the head. For most embodiments, a throat height 69 of less than about one micron is preferable. In this embodiment, nonmagnetic gap 77 expands to be greater than one-half micron at a throat height of less than one-half micron. Pedestal 75 provides precise definition of the throat height 69.

For clarity, trailing corner 71 of pole tip 70 is not labeled in FIG. 3 due to the concentration of flux lines 98 at its location. Because the trailing corner 71 is adjacent to both the soft magnetic underlayer 55 and the soft magnetic pole layer 78, flux from that trailing corner may flow into both underlayer 55 and pole layer 78, increasing the density of flux emanating from the trailing corner 71. The highest concentration of flux 98 traversing media layer 58 emanates from trailing corner 71 and is directed at an angle that is neither perpendicular nor parallel to the medium-facing surface 66. The angled flux 98 provides increased torque to rotate magnetic dipoles in the media layer 58 that are oriented substantially perpendicular to the disk surface 53. In one embodiment, the maximum flux density emanating from trailing corner 71 is directed at an angle between twenty degrees and sixty degrees from perpendicular to the medium surface 53, and preferably at about forty-five degrees to that surface 53.

Because the medium is moving relative to the head in the direction shown by arrow 59, a media layer 58 bit that has been magnetized by angled flux 98 from trailing corner 71 subsequently encounters flux that is directed from soft underlayer 55 to pole tip 80. The flux 98 traversing media layer 58 adjacent to return pole tip 80, however, is much less concentrated than that adjacent to trailing corner 71, and also much less effective due to being oriented substantially parallel to the easy axis of magnetization of media layer 58.

Figure 4:
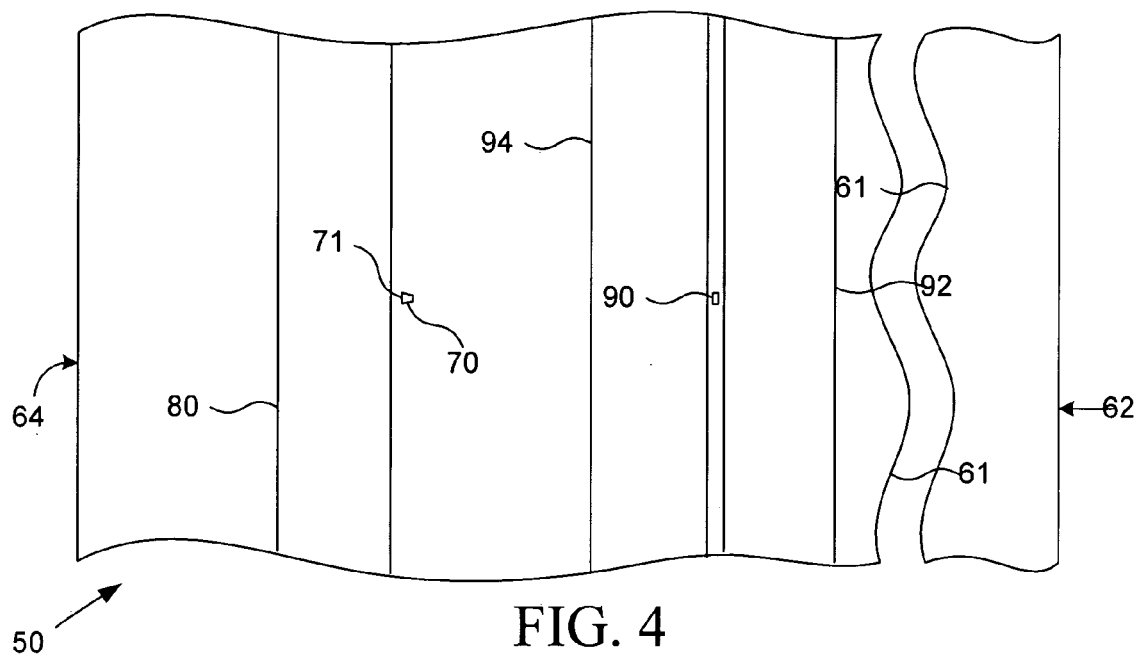
FIG. 4 is a cutaway view of the head of FIG. 1 as seen from the medium.

FIG. 4 is a cutaway view of the head 60 of FIG. 1 as seen from the medium, looking through the thin transparent coating 97 of the medium-facing surface 66, which are therefore not evident in this figure. Although not necessarily drawn to scale, the dramatically different size of the write pole tip 70 compared to the return pole tip 80 is apparent. The write pole tip 70 may be trapezoidal in shape, with a track-width dimension along trailing corner 71 of approximately 0.15 micron or less, and a track-length dimension of approximately one-half micron or less, and preferably less than one-quarter micron. The medium-facing area of write pole tip 70 is therefore less than 0.08 square microns (less than 80,000 square nanometers). Return pole tip 80 may measure on the order of 1.0 micron in the track-length dimension, and may extend 10 to 100 microns in the track-width dimension, large enough that the full width of this embodiment is not shown in this cutaway drawing. The medium-facing area of return pole tip 80 is therefore at least two orders of magnitude greater than that of medium-facing area of write pole tip 70.

Figure 5:
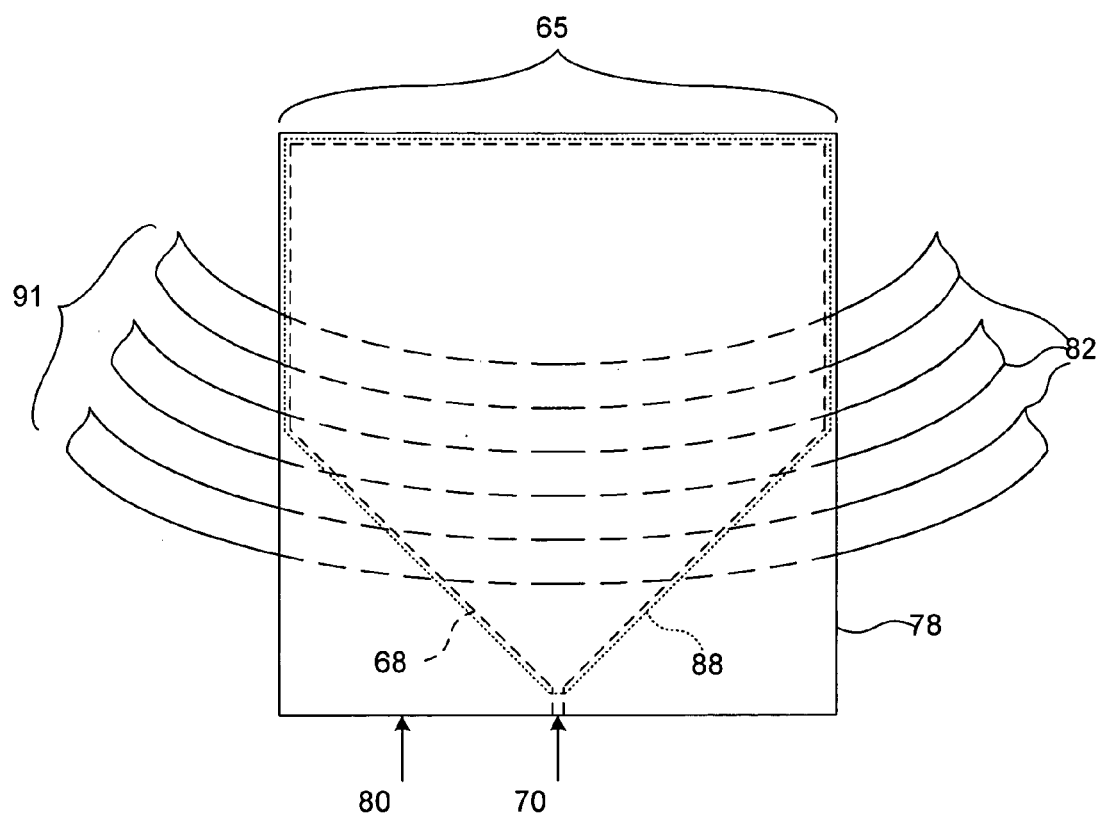
FIG. 5 is a view of the head of FIG. 1 as would be seen looking at the trailing end and focusing on the active elements of the write transducer.

FIG. 5 is a view of the head 60 as would be seen looking at the trailing end 64 and focusing on the active elements of the write transducer, including ferromagnetic layers 68, 78 and 88, and coil layer 91. Coil sections 82 are cutaway so that entire spiral coil layer 91 is not shown. Write pole tip 70 can be seen to have a much smaller track-width than return pole tip 80. The ferromagnetic layers 68, 78 and 88 are magnetically coupled in region 65.

Figure 6:
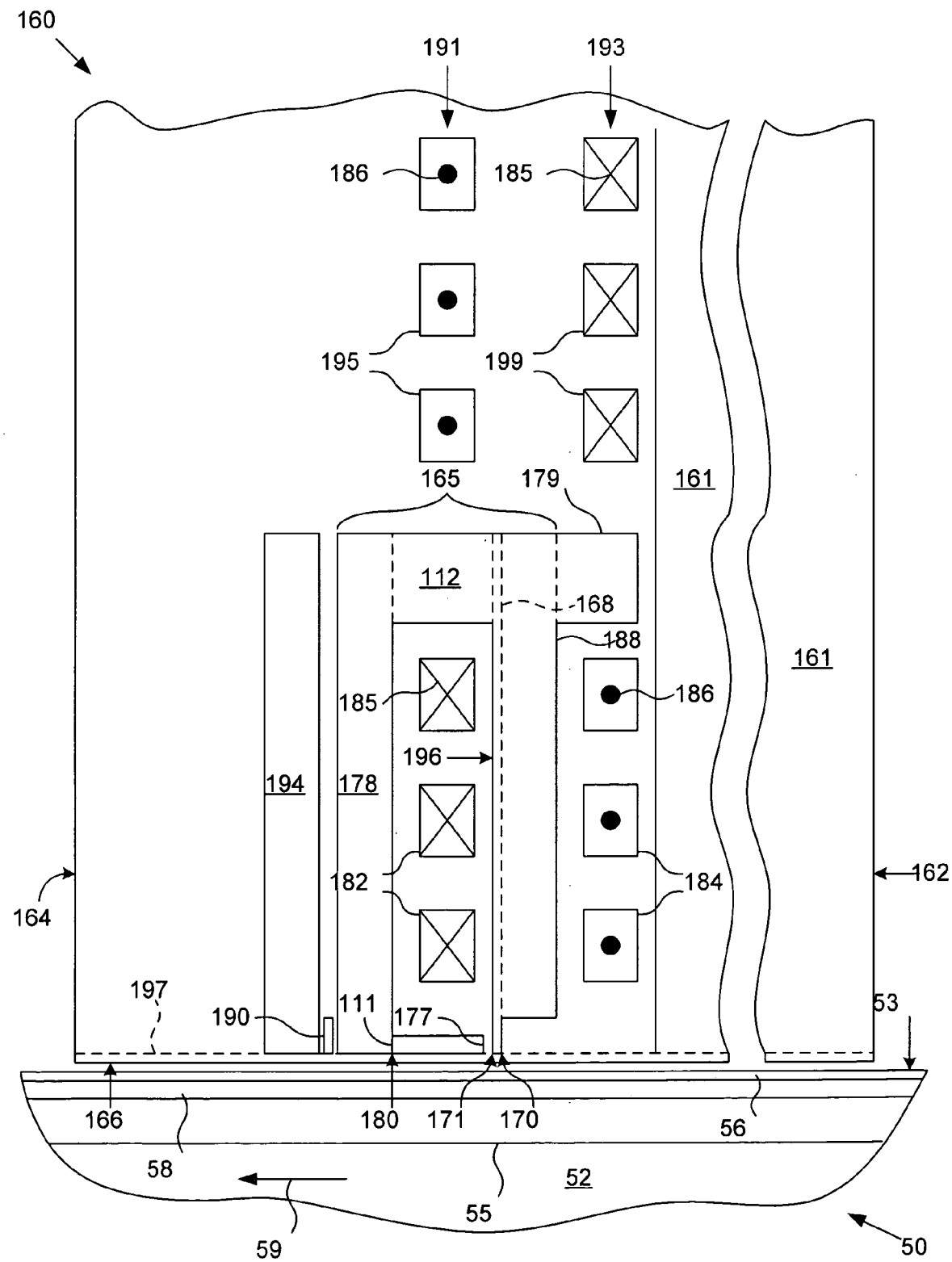
FIG. 6 is a cutaway cross-sectional view of an electromagnetic head in which a write transducer is disposed closer than a MR sensor to a wafer substrate.

FIG. 6 is a cutaway cross-sectional view of an electromagnetic head 160 in which a write transducer 110 is disposed closer than an MR sensor 190 to a wafer substrate 161. As with the previous embodiment, the head is in close proximity to a relatively moving medium 50.

The head 160 has a leading end 162, a trailing end 164 and a medium-facing surface 166. A first ferromagnetic layer 168, which may sometimes be called a write pole layer, is disposed in the head and terminates adjacent to the medium-facing surface in a first pole tip 170, which may sometimes also be called a write pole tip. A second ferromagnetic layer 178, which may sometimes be called a return pole layer, is magnetically coupled to the first ferromagnetic layer 168 by a soft magnetic stud 112 in a region 165 that is removed from the medium-facing surface 166, the second ferromagnetic layer terminating adjacent to the medium-facing surface in a second pole tip 180. The second pole tip 180, which may sometimes be called a return pole tip, is disposed between the first pole tip 170 and the trailing end 164. A soft magnetic pedestal 111 adjoins second ferromagnetic layer 178 to form part of the second pole tip 180, the pedestal 111 being separated from the first pole tip by a nanoscale nonferromagnetic gap 177. A third ferromagnetic layer 188 adjoins the first ferromagnetic layer 168 but terminates further from the medium-facing surface 166 than the first pole tip 170. The ferromagnetic layers 111, 112, 168, 178 and 188 of the head 160 may have a permeability of at least one thousand, while layer 168 may also be formed of a high magnetic moment material, e.g., having a magnetic saturation of at least twenty kiloGauss. First ferromagnetic layer 168 has a trailing edge 196 disposed adjacent to trailing end 164. A trailing corner 171 of first pole tip 170, disposed where first pole tip 170 meets trailing edge 196, is approximately equidistant from soft magnetic underlayer 55 and soft magnetic pedestal 111.

A plurality of electrically conductive coil sections 182 are disposed between the first ferromagnetic layer 168 and the second ferromagnetic layer 178 to induce magnetic flux in the soft magnetic layers 111, 112, 168, 178 and 188. Those ferromagnetic layers 111, 112, 168, 178 and 188 form a magnetic loop around coil sections 182, the loop interrupted by nanoscale nonferromagnetic gap 177. Another plurality of electrically conductive coil sections 186 are similarly disposed between the first ferromagnetic layer 168 and the leading end 162. Crosses 185 in the coil sections 182 indicate electric current that is flowing away from the viewer and into the page, while dots 186 in the coil sections 184 indicate electric current that is flowing toward the viewer and out of the page. With electric current flowing in substantially opposite directions in sections 182 and 184 as shown, the magnetic field from the coil sections 182 and 184 adds together in the area between the sections 182 and 184 and is at least partly cancelled in areas outside the sections 182 and 184 that are closer to the leading or trailing end.

The coil sections 182 in this embodiment are part of a first coil layer 191 that spirals around coupling region 165 and includes electrically conductive coil sections 195, and coil sections 184 are part of a second coil layer 193 that spirals around optional soft magnetic stud 179 and includes electrically conductive coil sections 199. Coil sections 195 have electric current that is flowing toward the viewer and out of the page, as indicated by dots 186, while coil sections 199 have electric current that is flowing away from the viewer and into of the page, as indicated by crosses 185. Advantages of this type of reversed double coil layer configuration include a stronger applied field between the coil layers 191 and 193 and reduced or cancelled field leading and trailing the coil layers, as well as reduced coil inductance and reduced amplification of stray signals due to an antenna effect. The coil layers may spiral in identical directions, e.g., both spiraling inward in a counterclockwise direction when viewed from the trailing end, and be interconnected at the center sections or outermost sections. Alternatively, the coil layers may spiral in opposite directions and have the center section of one layer connected to the outermost section of the other layer.

Instead of the configuration shown in FIG. 6, coil sections 182 and 184 may spiral in a barber pole formation around ferromagnetic layers 168 and 188, without the need for coil sections 195 and 199. Alternatively, instead of plural coil sections 182, a single coil section, or multiple coil sections, may pass between layers 168 and 178. For the case in which coil section 182 is a single section formed as a layer, that layer may be connected to a similar layer disposed between layer 188 and the leading end 162. This formation may be termed a single turn coil.

The ferromagnetic layers 111, 112, 168 and 178 of the head 160 together with the soft magnetic underlayer 55 of the disk 50 form a magnetic circuit that traverses the media layer adjacent the first pole tip 170 and the second pole tip 180. Although not clear in this cross-sectional view, the second pole tip 80 has a medium-facing area that is at least two orders of magnitude greater than that of the first pole tip 170, to avoid overwriting with the second pole tip signals that were imparted to the media layer by the first pole tip.

The head 160 also includes a MR sensor 190 sandwiched between soft magnetic pole layer 178 and soft magnetic shield layer 194, with the MR sensor disposed within one-half micron of the return pole tip 180. Stated differently, the second pole layer is merged with the first shield layer. An advantage of this configuration is that the coil layer 193, which may have cured or hardbaked photoresist disposed between its coils sections 184 and 199, is closer to the substrate, which can serve as a heat sink for resistive heat generated by the coil layer 193. Because cured or hardbaked photoresist has a greater coefficient of thermal expansion than other materials of head 160, resistive heating of the coil layers may otherwise cause bulging of the coil layers that causes a slight protrusion at the medium-facing surface. In the embodiment shown, such protrusion would be reduced in coil layer 193 but optionally not as greatly reduced in coil layer 191, which may result in slight protrusion of pole tips 170 and 180, which can help with writing signals to the medium 50.

The MR sensor 190 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. A thin hard coating 197 formed for example of DLC, SiC, ta-C or the like protects the MR sensor 190 from corrosion or other damage, the coating forming at least part of the medium-facing surface 166. The substrate 161 may extend much further between the coil layer 193 and the leading end 162 than the distance between the coil layer 193 and the trailing end 164, and may be formed of any appropriate substrate material known in the art of magnetic heads, such as alumina, silicon, alumina-titanium-carbide, etc.

Figure 7:
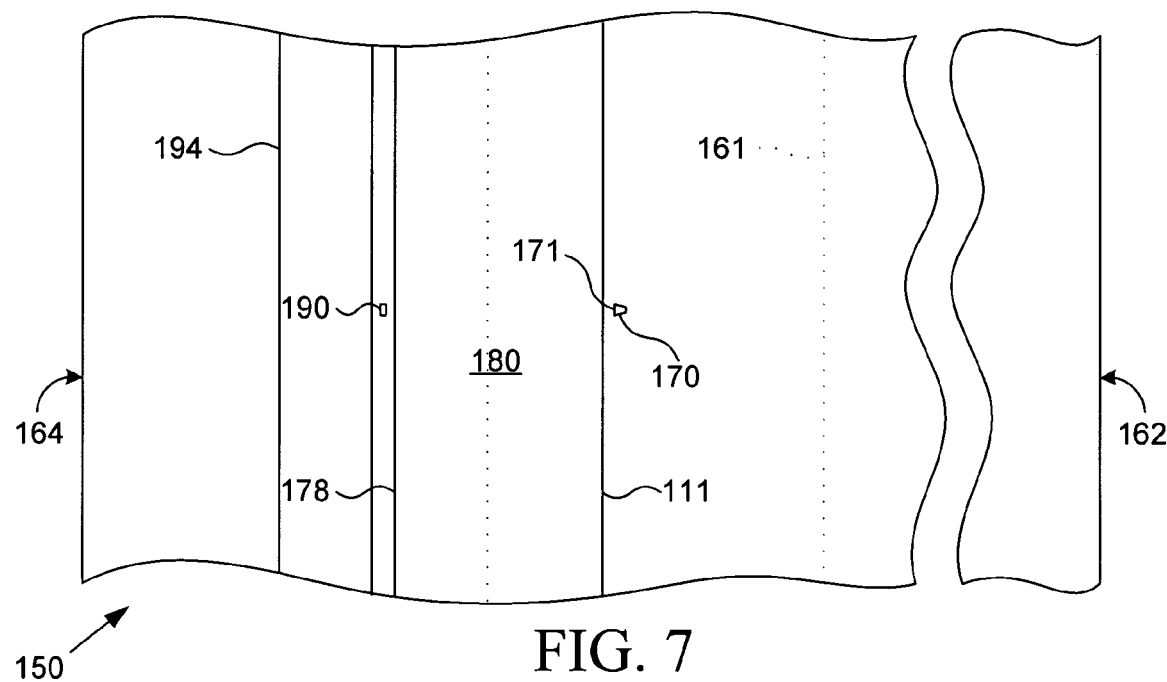
FIG. 7 is a cutaway view of the head of FIG. 6 as seen from the medium.
Figure 9:
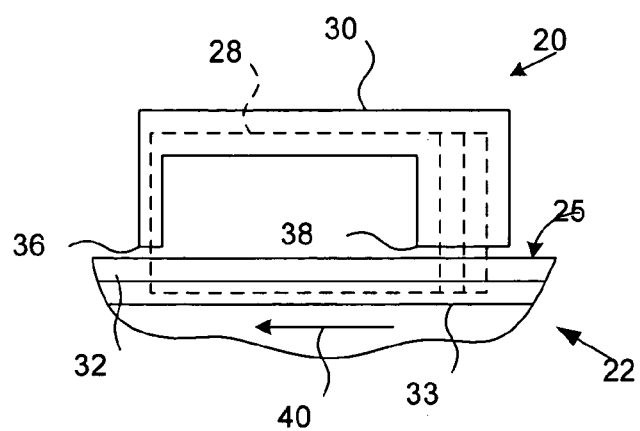
FIG. 9 is a cross-section of a prior art system for perpendicular recording, including a transducer with a write pole and a return pole and a medium with a soft magnetic underlayer.

FIG. 7 is a cutaway view of the head 160 of FIG. 6 as seen from the medium, looking through the thin transparent coating of the medium-facing surface, which are therefore not evident in this figure. Although not necessarily drawn to scale, the dramatically different size of the write pole tip 170 compared to the return pole tip 180 is apparent. The write pole tip 170 may be trapezoidal in shape, with a track-width dimension along the trailing corner 171 of approximately 0.15 micron (150 nanometers) or less, and a track-width dimension of approximately 0.25 micron (250 nanometers) or less. The medium-facing area of write pole tip 170 is therefore less than 0.04 square microns (40,000 square nanometers). Return pole tip 180 may measure on the order of 1.0 micron in the track-length dimension, and may extend 10 to 100 microns in the track-width dimension, large enough that its full width is not shown in this cutaway drawing. The medium-facing area of return pole tip 180 is therefore at least two orders of magnitude greater than that of medium-facing area of write pole tip 170.

Figure 8:
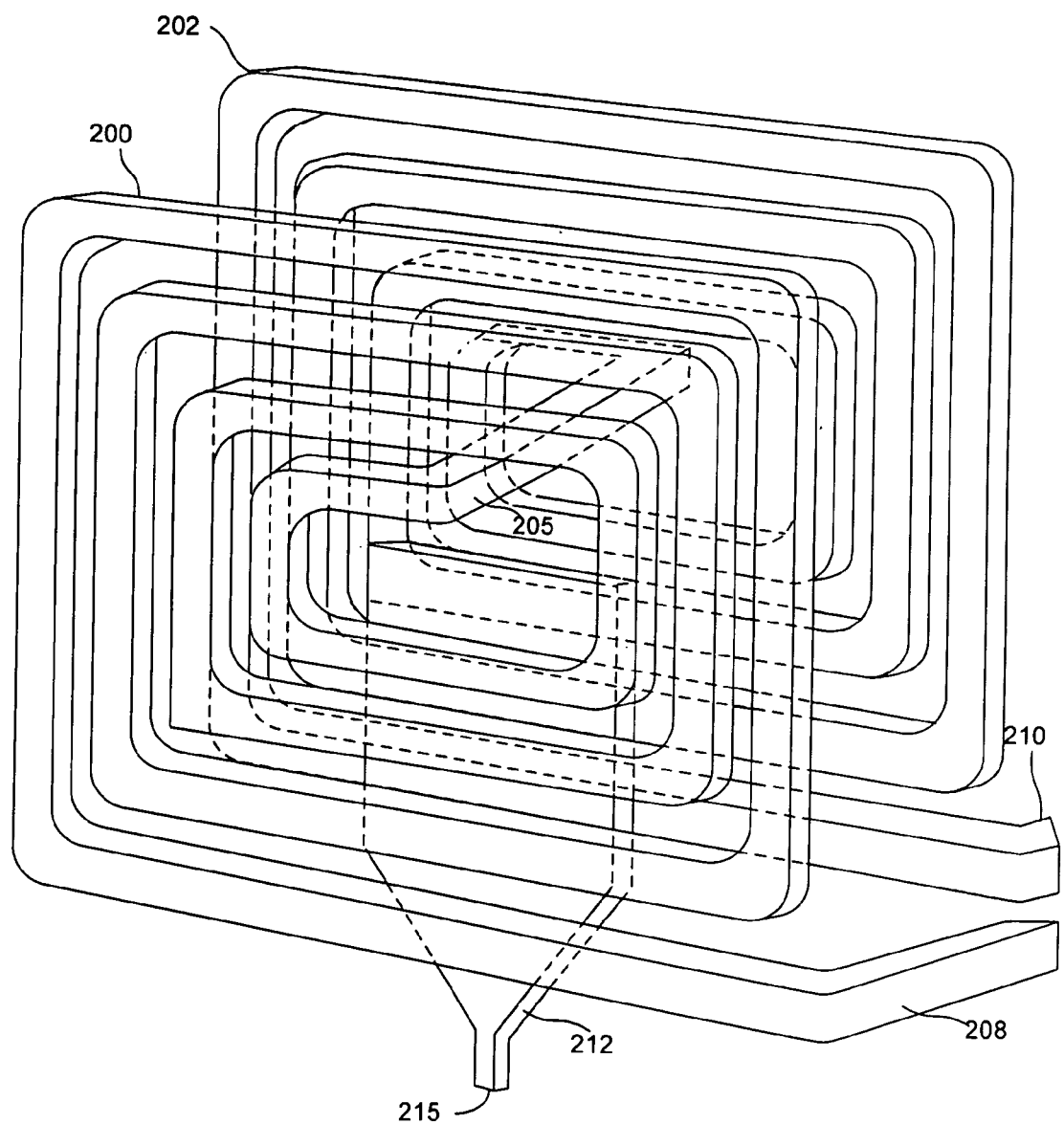
FIG. 8 is a perspective view of dual spiral coil layers interconnected at interconnect to illustrate one kind of double reverse coil formation that may be employed.

FIG. 8 shows a perspective view of a spiral coil layer 200 and a spiral coil layer 202 that are interconnected at interconnect 205, to illustrate one kind of double reverse coil formation that may be employed. Electrical connections 208 and 210 provide current for the coil layers 200 and 202, provided by amplifiers and drive electronics. A tapered ferromagnetic write pole layer 212 and write pole tip 215 are shown but, for clarity, other pole layers, other pole tips and magnetic coupling regions are not shown.

Referring again to FIG. 1, a method for making the head 60 is described. The head 60 is formed in a number of thin-film transducer layers, along with thousands of similar heads, not shown, on the wafer substrate 61, which may be made of alumina-titanium-carbide, alumina, silicon-carbide, ferrite or other known materials. Atop the wafer substrate 61 the first soft magnetic shield layer 92 is formed, for example by window frame plating, either directly on the substrate or atop a seed layer, not shown. After completion of processing, first shield layer 92 may have a thickness of about one or two microns, a height measured from the medium-facing surface of about thirty microns and a width of about ten or twenty microns, for example.

An alumina or other dielectric layer is then deposited and lapped to form a coplanar surface with the first shield layer 92. A first nanoscale read gap layer of nonmagnetic, electrically insulating material is formed on the shield layer, followed by the magnetoresistive (MR) sensor 90. A second nanoscale read gap layer of nonmagnetic, electrically insulating material is then formed between the MR sensor and the second soft magnetic shield layer 94. The MR sensor 90 may be electrically connected to the shield layers 92 and 94 in some embodiments, such as spin-dependent tunneling sensors.

The second shield layer 94 is formed, for example by window frame plating, to a thickness after lapping of about one or two microns and a width of about ten or twenty microns, for example. The height of second shield layer 94 is a controlled parameter in obtaining zero stray field at the MR sensor 90 for the dual reverse coil arrangement, and may be about equal to that of the pole layers 68 and 88, or about ten microns in this embodiment after completion of fabrication. Since other factors may be employed to obtain zero stray field at the MR sensor 90, the height of the second shield layer may be in a range between about five microns and one hundred microns.

After lapping the second shield layer 94 another dielectric layer is formed to a thickness that may preferably be between less than one micron and several microns, upon which electrically conductive coil layer 93 is formed, for example by electroplating followed by curing photoresist or filling with alumina. Coil layer 93 may be formed of copper, gold, silver or other electrically conductive materials. A coil layer 202 similar to coil layer 93 is shown in perspective view in FIG. 8. Coil layer 93 is formed in a spiral pattern with winding sections 84 substantially parallel to the medium-facing surface 66 in a region adjacent to second shield 94. Coil layer 93 may have a thickness on the order of one micron, and winding sections 84 may have a rectangular cross-section of about one micron in thickness by one and one-half microns in height in one embodiment, with a distance between winding sections 84 of about one micron. The distance of the coil layer 93 from the media-facing surface 66 may be in a range between about two microns and six microns in this embodiment.

After polishing the coil layer 93 a first portion of an electrically conductive interconnect is formed, similar to interconnect 205 shown in FIG. 8, upon which another dielectric layer is formed to a thickness that may preferably be between less than one micron and several microns, after lapping that exposes the interconnect portion. The third ferromagnetic layer 88 is then formed along with another portion of the electrically conductive interconnect, for example by separate frame plating steps. The third soft magnetic layer 88 has a thickness after lapping that may be about one micron, is spaced about one to three microns from the medium-facing surface, and extends about eight to fifteen microns from the medium-facing surface, for example. The third ferromagnetic layer 88 has a tapered width that funnels magnetic flux to the pole tip 70, the width ranging from about ten microns distal to the media-facing surface 33 to lees than one micron, e.g., 0.2 micron adjacent to the pole tip 70.

The first ferromagnetic layer 68 is then formed of high magnetic saturation (high $B_{SAT}$) material, for example by sputtering or other known techniques. High magnetic saturation materials that may be used to form layer 68 include FeN and FeN based alloys, predominantly iron NiFe, CoFe and related alloys, etc. The first ferromagnetic layer 68 may have a tapered shape that mirrors that of third ferromagnetic layer 88 but extends further to terminate in pole tip 70. The first ferromagnetic layer 68 may be less than one-half micron in thickness and may be formed to have a trapezoidal cross-section parallel to the medium-facing surface, as disclosed in U.S. patent application Ser. No. 09/933,508, which is incorporated by reference herein.

The nanoscale nonferromagnetic gap 77 is then formed of insulating material such as alumina, silicon dioxide or the like, or conductive material such as tantalum, chromium, nickel-chromium or the like, the thickness the gap 77 layer depending upon the desired spacing between the pole tip 70 and the soft magnetic underlayer 55 of the medium 50 and the desired angle of maximum flux from trailing corner 71. The soft magnetic pedestal 75 and soft magnetic stud 79 are then formed in plural layers to a thickness of between about two and ten microns by techniques such as window frame plating to connect the pole layer 68 with the pole layer 78. After forming the gap 77 a first layer of soft magnetic pedestal 75 and soft magnetic stud 79 are formed along with another portion of the electrically conductive interconnect, for example by separate frame plating steps.

Electrically conductive coil layer 91 may then be formed, for example by frame plating of copper, gold, silver or other electrically conductive materials. Coil layer 91, similar to coil layer 200 shown in FIG. 8, is formed in a spiral pattern with coil sections 82 that are substantially parallel to the media-facing surface 33 in a region adjacent to pole layer 68. A central coil section 82 is connected with the electrically conductive interconnect. Coil layer 91 may have a thickness on the order of one micron, and winding sections 84 may have a rectangular cross-section of about one micron in thickness by one and one-half microns in height in one embodiment, with a distance between winding sections 84 of about one micron.

After polishing the coil layer 91 a final portion of soft magnetic pedestal 75 and soft magnetic stud 79 are formed, upon which another dielectric layer is formed to a thickness that may preferably be between less than one micron and several microns, after lapping that exposes the stud portion. The remainder of second ferromagnetic layer 78 is then formed, for example by frame plating, to a thickness between less than one micron and several microns, e.g., 1.5 microns, a height that preferably matches that of the ferromagnetic layer 68 and a width that may be tens of microns in the coupling region 65. Ferromagnetic layer 78 terminates adjacent the media-facing surface in a second pole tip 80 that faces the medium 50, second pole tip 80 having a medium-facing surface at least two orders of magnitude larger than that of first pole tip 70. For example, second pole tip 80 may have a media-facing area that is greater than 10 square microns, so that second pole tip may have a medium-facing area that is between 100 and 100,000 times larger than that of first pole tip 70.

A protective coating of dielectric material such as alumina or DLC is then formed over ferromagnetic layer 78, to form the trailing end of the head 60. Electrical connections, similar to elements 208 and 210 shown in FIG. 8, extend from coil layers 91 and 93, respectively, to provide electrical contacts either on the trailing end 64 or on a back surface of the head disposed opposite to the media-facing surface 66. Similar electrical leads, not shown, extend from the MR sensor 90 to provide additional electrical contacts either on the trailing end 64 or the back surface.

After forming the protective coating to create the trailing end 64, the wafer substrate 61 and attached thin film layers are diced to form rows of heads, as is known in the art, and the medium-facing surface is formed. The protective coating 97 of hard dielectric material such as DLC, ta-C, SiC or the like is formed. The rows are then divided into individual heads that are attached to suspensions for positioning adjacent to disks in drive systems.

What is claimed is:

1. A magnetic head for writing information on a relatively-moving medium, the head comprising:
a body having a leading end, a trailing end and a medium-facing surface, the body including an electrically conductive coil section at least partly encircled by a magnetic loop terminating in a write pole tip and a return pole tip that are disposed adjacent to the medium-facing surface and separated from each other by a nanoscale nonmagnetic gap, wherein the return pole tip is disposed between the write pole tip and the trailing end and the return pole tip has a medium-facing area that is at least two orders of magnitude greater than that of the write pole tip.

2. The head of claim 1, wherein the write pole tip has a trialing corner disposed closest to the trailing end, and magnetic flux emanating from the write pole tip has a maximum density emanating from the trailing corner and directed at an angle that is not perpendicular to the write pole tip.

3. The head of claim 1, further comprising a magnetoresistive sensor disposed less than one-half micron from the return pole tip.

4. The head of claim 1, further comprising an electrically conductive winding section electrically connected to the coil section, such that a current flowing in a first direction in the coil section flows in a substantially opposite direction in the winding section, with the coil section disposed between the write pole tip and the trailing end, and the winding section disposed between the write pole tip and the leading end.

5. The head of claim 4, wherein the coil section is part of an electrically conductive coil that spirals around a first magnetic section that magnetically couples the write pole tip to the return pole tip, and the winding section is part of an electrically conductive winding that spirals exterior to the magnetic loop, such that a current spiraling in a first direction in the coil spirals in a substantially opposite direction in the winding.

6. The head of claim 1, wherein the coil section is part of an electrically conductive coil that spirals around a first magnetic section that magnetically couples the write pole tip to the return pole tip, and the coil is connected to an electrically conductive winding that spirals exterior to the magnetic loop, such that a current flowing in a first direction in the coil flows in a substantially opposite direction in the winding.

7. The head of claim 1, wherein the write pole tip has a medium-facing area that is less than about thirty thousand square nanometers.

8. The head of claim 1, wherein the write pole tip has a trailing corner adjoining the nonmagnetic gap, and magnetic flux emanating from the trailing corner has a maximum density at an angle that is between about twenty degrees and sixty degrees from perpendicular to the medium-facing surface.

9. The head of claim 1, wherein the write pole tip has a trailing corner adjoining the nonmagnetic gap, the return pole tip has a leading corner adjoining the nonmagnetic gap, and the trailing corner is made of higher magnetic saturation material than that of the leading corner.

10. The head of claim 1, wherein the nonmagnetic gap expands at a throat height, the throat height being measured from the medium-facing surface and being less than one-half micron.

11. The head of claim 1, further comprising a magnetoresistive sensor that is disposed in the body between a pair of shields that are located adjacent to the magnetic loop.

12. The head of claim 1, further comprising a magnetoresistive sensor disposed less than one-half micron from the return pole tip.

13. The head of claim 1 wherein the write pole tip has a trialing corner disposed closest to the trailing end, and magnetic flux emanating from the write pole tip has a maximum density emanating from the trailing corner and is directed at an angle that is not perpendicular to the write pole tip and is toward the return pole tip.

14. A magnetic head for writing information on a relatively-moving medium containing a media layer and a soft magnetic underlayer, the head comprising:
a body having a leading end, a trailing end and a medium-facing surface, the body including an electrically conductive coil section at least partly encircled by a magnetic loop terminating in a write pole tip and a return pole tip that are disposed adjacent to the medium-facing surface and separated from each other by a nanoscale nonmagnetic gap, wherein the return pole tip is disposed between the write pole tip and the trailing end and the return pole tip has a medium-facing area that is at least two orders of magnitude greater than that of the write pole tip.

15. The head of claim 14, further comprising a magnetoresistive sensor disposed less than one-half micron from the return pole tip.

16. The head of claim 14, further comprising an electrically conductive winding section electrically connected to the coil section, such that a current flowing in a first direction in the coil section flows in a substantially opposite direction in the winding section, with the coil section disposed between the write pole tip and the trailing end, and the winding section disposed between the write pole tip and the leading end.

17. The head of claim 14, wherein a distance between the write pole tip and the return pole tip is approximately equal to a spacing between the write pole tip and the soft magnetic underlayer of the medium.

18. The head of claim 14, wherein the coil section is part of an electrically conductive coil that spirals around a first magnetic section that magnetically couples the write pole tip to the return pole tip, and the coil is connected to an electrically conductive winding that spirals exterior to the magnetic loop, such that a current spiraling in a first direction in the coil spirals in a substantially opposite direction in the winding.

19. The head of claim 14, wherein the write pole tip has a medium-facing area that is less than about thirty thousand square nanometers.

20. The head of claim 14, wherein the write pole tip has a trailing corner disposed adjacent to the trailing end, and magnetic flux from the trailing corner that impinges the media layer is directed in a range between about twenty degrees and sixty degrees from perpendicular to the medium-facing surface.

21. The head of claim 14, wherein the magnetic loop includes a first ferromagnetic layer and a second ferromagnetic layer, the first ferromagnetic layer including the write pole tip and the second ferromagnetic layer including the return pole tip, the second ferromagnetic layer is separated from the first ferromagnetic layer by more than one-half micron at a throat height, the throat height being measured from the medium-facing surface and being less than one-half micron.

22. The head of claim 14, wherein the nonmagnetic gap expands at a throat height, the throat height being measured from the medium-facing surface and being less than one-half micron.

23. The head of claim 14, wherein the write pole tip has a trialing corner disposed closest to the trailing end, and magnetic flux emanating from the write pole tip has a maximum density emanating from the trailing corner and directed at an angle that is not perpendicular to the write pole tip.

24. The head of claim 14 wherein the write pole tip has a trialing corner disposed closest to the trailing end, and magnetic flux emanating from the write pole tip has a maximum density emanating from the trailing corner and is directed at an angle that is not perpendicular to the write pole tip and is toward the return pole tip.

25. A magnetic head for writing information on a relatively-moving medium containing a media layer and a soft magnetic underlayer, the head having a leading end, a trailing end, and a medium-facing surface, the head comprising:
  a first ferromagnetic layer terminating in a first pole tip disposed adjacent to the medium-facing surface,
  a second ferromagnetic layer magnetically coupled to the first ferromagnetic layer in a region that is removed from the medium-facing surface, the second ferromagnetic layer terminating in a second pole tip that is disposed adjacent to the medium facing surface and located between the first pole tip and the trailing end, the second pole tip being separated from the first pole tip by a nanoscale nonferromagnetic gap and having a medium-facing aria that is at least two orders of magnitude greater than that of the first pole tip; and
  an electrically conductive coil section disposed between the first ferromagnetic layer and the second ferromagnetic layer to induce magnetic flux in the first ferromagnetic layer.

26. The head of claim 25, further comprising an electrically conductive winding section electrically connected to the coil section, with the first ferromagnetic layer disposed between the coil section and the winding section, such that a current spiraling in a first direction in the coil section flows in a substantially opposite direction in the winding section.

27. The head of claim 25, wherein the coil section is part of an electrically conductive coil that spirals around the region that magnetically couples the first ferromagnetic layer to the second ferromagnetic layer, and the coil is connected to an electrically conductive winding that spirals around an axis that is aligned with the region, such that a current spiraling in a first direction in the coil spirals in a substantially opposite direction in the winding.

28. The head of claim 25, wherein the first pole tip has a medium-facing area that is less than about thirty thousand square nanometers.

29. The head of claim 25, wherein the first pole tip has a trailing corner disposed adjacent to the trailing end, and magnetic flux from the trailing corner that impinges the media layer is directed in a range between about twenty degrees and sixty degrees from perpendicular to the medium-facing surface.

30. The head of claim 25, wherein the nonferromagnetic gap expands at a throat height, the throat height being measured from the medium-facing surface and being less than one micron.

31. The head of claim 25, further comprising a magnetoresistive sensor disposed less than one-half micron from the second pole tip.

32. The head of claim 25, wherein a distance between the first pole tip and the second pole tip is approximately equal to a spacing between the first pole tip and the soft magnetic underlayer of the medium.

33. The head of claim 25 wherein the first pole tip has a trialing corner disposed closest to the trailing end, and magnetic flux emanating from the first pole tip has a maximum density emanating from the trailing corner and is directed at an angle that is not perpendicular to the first pole tip and is toward the second pole tip.

34. A magnetic head for writing information on a relatively-moving medium, the head having a leading end, a trailing end, and a medium-facing surface, the head comprising:
  a first ferromagnetic write pole layer terminating in a write pole tip disposed adjacent to the medium-facing surface,
  a ferromagnetic return pole structure disposed between the write pole layer and the trailing end and magnetically coupled to the write pole layer in a coupling region, the return pole structure terminating adjacent to the medium-facing surface in a return pole tip having an area that is at least two orders of magnitude greater than that of the write pole tip, the pole tips separated by a nanoscale nonferromagnetic gap and;
  a first electrically conductive coil section that winds about the coupling region, the first coil including at least one coil section that is disposed between the write pole layer and the return pole structure;
  a second electrically conductive coil that carries current in a substantially opposite direction to that flowing in the first coil to induce a magnetic field between the coils that is stronger than the field induced outside the coils, the second coil disposed closer than the first coil to the trailing end.

35. The head of claim 34, wherein the first ferromagnetic write pole layer has a thickness that is less than one-half micron.

36. The head of claim 34, further comprising a magnetoresistive sensor disposed within one-quarter micron from the return pole tip.

37. The head of claim 34, wherein the second ferromagnetic layer is separated from the first ferromagnetic layer by more than one-half micron at a throat height, wherein the throat height is measured from the medium-facing surface and is less than one-half micron.

* * * * *